(12) United States Patent
Dodrill et al.

(10) Patent No.: US 8,099,283 B2
(45) Date of Patent: *Jan. 17, 2012

(54) APPLICATION SERVER PROVIDING PERSONALIZED VOICE ENABLED WEB APPLICATION SERVICES USING EXTENSIBLE MARKUP LANGUAGE DOCUMENTS

(75) Inventors: Lewis Dean Dodrill, Richmond, VA (US); Satish Joshi, Glen Allen, VA (US); Ryan Alan Danner, Glen Allen, VA (US); Steven J Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,680

(22) Filed: Nov. 8, 2010

(65) Prior Publication Data
US 2011/0060810 A1 Mar. 10, 2011

Related U.S. Application Data

(63) Continuation of application No. 11/108,119, filed on Apr. 18, 2005, now Pat. No. 7,831,430, which is a continuation of application No. 09/567,223, filed on May 9, 2000, now Pat. No. 6,901,431.

(60) Provisional application No. 60/152,316, filed on Sep. 3, 1999.

(51) Int. Cl.
*G10L 11/00* (2006.01)
*G06F 17/30* (2006.01)
*G06F 15/16* (2006.01)

(52) U.S. Cl. .................. 704/270; 707/769; 709/217

(58) Field of Classification Search .............. 704/270, 704/270.1, 275; 709/204, 206, 217
See application file for complete search history.

(56) References Cited

U.S. PATENT DOCUMENTS

| 4,837,798 A | 6/1989 | Cohen et al. |
| 5,907,598 A | 5/1999 | Mandalia et al. |
| 5,915,001 A | 6/1999 | Uppaluru |

(Continued)

OTHER PUBLICATIONS

Bos, "XML in 10 Points", W3.org (Aug. 26, 1999).

*Primary Examiner* — Angela A Armstrong
(74) *Attorney, Agent, or Firm* — Leon R. Turkevich

(57) ABSTRACT

A unified web-based voice messaging system provides voice application control between a web browser and an application server via an hypertext transport protocol (HTTP) connection on an Internet Protocol (IP) network. The application server, configured for executing a voice application defined by XML documents, selects an XML document for execution of a corresponding voice application operation based on a determined presence of a user-specific XML document that specifies the corresponding voice application operation. The application server, upon receiving a voice application operation request from a browser serving a user, determines whether a personalized, user specific XML document exists for the user and for the corresponding voice application operation. If the application server determines the presence of the personalized XML document for a user-specific execution of the corresponding voice application operation, the application server dynamically generates a personalized HTML page having media content and control tags for personalized execution of the voice application operation; however if the application server determines an absence of the personalized XML document for the user-specific execution of the corresponding voice application operation, the application server dynamically generates a generic HTML page for generic execution of the voice application operation. Hence, a user can personalize any number of voice application operations, enabling a web-based voice application to be completely customized or merely partially customized.

20 Claims, 8 Drawing Sheets

U.S. PATENT DOCUMENTS

| | | |
|---|---|---|
| 6,101,472 A | 8/2000 | Giangarra et al. |
| 6,233,318 B1 | 3/2001 | Picard et al. |
| 6,269,336 B1 | 7/2001 | Ladd et al. |
| 6,282,284 B1 | 8/2001 | Dezonno et al. |
| 6,301,245 B1 | 10/2001 | Luzeski et al. |
| 6,385,583 B1 | 5/2002 | Ladd et al. |
| 6,421,708 B2 | 7/2002 | Bettis |
| 6,535,896 B2 | 3/2003 | Britton et al. |
| 6,578,000 B1 * | 6/2003 | Dodrill et al. .............. 704/270 |
| 6,901,431 B1 * | 5/2005 | Dodrill et al. .............. 709/207 |
| 7,346,840 B1 * | 3/2008 | Ravishankar et al. ....... 715/234 |
| 7,831,430 B2 * | 11/2010 | Dodrill et al. ............. 704/270.1 |

* cited by examiner

```
<?xml version="1.0"?>
<!DOCTYPE DOCUMENT [
<!ELEMENT DOCUMENT (Menu Variables, Options)>
<!ELEMENT MenuVariables (#PCDATA)*>
<!ATTLIST MenuVariables name CDATA #REQUIRED
                        value CDATA #REQUIRED
<!ELEMENT Options       (#PCDATA)*>
<!ATTLIST Options name CDATA #REQUIRED
                  value CDATA #REQUIRED
                  text CDATA #IMPLIED>          ──110
]>
<DOCUMENT>
                                                        ┌─106b
104b ──<MenuVariables name="MenuName"       value="Main Menu"/>
104c ──<MenuVariables name="DefaultPrompt" ┌─106c
       value="AUD_MAIN_MENU_PROMPT.wav"/>
       <MenuVariables name="Components"     value=""/>
                                                            ┌─106d
       <MenuVariables name="Conditions"     value=""/>
104d ──<MenuVariables name="Fallback"       value="LOGOUT_CLEANUP.xml"/>
104e ──<MenuVariables name="Type"           value="MENU"/> ─106e
104f ──<MenuVariables name="InputMask"      value=StandardMenu"/> ─106f
104g ──<MenuVariables name="Images"         value=""/> ─106g
104a ──<MenuVariables name="Text"           value="To get your messages, ─106a
       press1. To logout, press *9"/> 114a₁ 114a₂ ─114a₃
112a ──<Options name="1" value="MENU:ACT_GET_VOICE_MESSAGES.xml"
                text="Access your messages."/> ─114b₂   ┌─114b₃
112b ──<Options name="2" value="SOUND:AUD_MAIN_MENU_HELP.wav"
       114b₁ text="Access your messages."/>
112c ──<Options name="*9"      value="DECISION:LOGOUT_CLEANUP.xml"
       114c₁ text="Send a message."/>      ─114c₂  ─114c₃
</DOCUMENT>
```

APPLICATION SERVER PROVIDING PERSONALIZED VOICE ENABLED WEB APPLICATION SERVICES USING EXTENSIBLE MARKUP LANGUAGE DOCUMENTS

CROSS REFERENCE TO RELATED APPLICATIONS

This application is a continuation of U.S. application Ser. No. 11/108,119, filed Apr. 18, 2005, which is a continuation of U.S. application Ser. No. 09/567,223, filed May 9, 2000 and issued on May 31, 2005 as U.S. Pat. No. 6,901,431, which claims priority from provisional U.S. application No. 60/152,316, filed Sep. 3, 1999, the disclosure of which is incorporated in its entirety herein by reference.

BACKGROUND OF THE INVENTION

1. Field of the Invention

The present invention relates to generating and executing voice enabled web applications within a hypertext markup language (HTML) and hypertext transport protocol (HTTP) framework.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example hypertext transport protocol (HTTP). The web server application environment can include web server software, such as Apache, implemented on a computer system attached to the IP network. Web-based applications are composed of HTML pages, logic, and database functions. In addition, the web server may provide logging and monitoring capabilities.

In contrast to the public switched telephone network, the open standards-based IP network has enabled the proliferation of web based applications written by web application developers using ever increasing web development tools. Hence, the ever increasing popularity of web applications and web development tools provides substantial resources for application developers to develop robust web applications in a relatively short time and an economical manner. However, one important distinction between telephony-based applications and web-based applications is that telephony-based applications are state aware, whereas web-based applications are stateless.

In particular, telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

Commonly-assigned, copending application Ser. No. 09/480,485, filed Jan. 11, 2000, entitled Application Server Configured for Dynamically Generating Web Pages for Voice Enabled Web Applications, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of application Ser. No. 09/480,485, by writing XML pages that specify respective voice application operations to be performed. The XML documents have a distinct feature of having tags that allow a web browser (or other software) to identify information as being a specific kind or type of information. In particular, commonly-assigned, copending application Ser. No. 09/501,516, filed Feb. 1, 2000 entitled Arrangement for Defining and Processing Voice Enabled Web Applications Using Extensible Markup Language Documents, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment.

Hence, the XML document described in the application Ser. No. 09/501,516, which can be written using a conventional editor or word processor, defines the application to be executed by the application server within the runtime environment, enabling voice enabled web applications to be generated and executed without the necessity of programming language environments.

Web-based service providers have offered personalized web pages to attract users to their web sites. In particular, web applications today are written using a combination of HTML user interface pages and common gateway interface (CGI) programs, enabling the user interface to be customized through HTML without disrupting the application logic and associated functions contained in the CGI program. Two classes of customization typically are found in personalized web pages, the first being interaction by a user with a web application that provides a presence for the user; the second class of customization involves a user interacting with an application that provides assistance for the user. An example of the first class of customization is when the web home page provides a customized presence for the user that others, who may not have any applications of their own, can interact with and select options from. An example of the second class of customization are pages such as "My Yahoo" or "My Netscape" that provide a customized presence for the user to interact with the web application that is specific to the user's needs.

The personalized web pages, however, require a client-side data record (i.e., a "cookie") to be sent between the browser and the web server. In particular, cookies are needed to enable a web server to track a user's status as the user moves from one web page to another; as the user navigates through different web page, the web server updates the user's cookie, eliminating the necessity for the user to identify himself or herself (by user name and password) for each web page access.

As described above, however, the use of cookies is not practical in voice-enabled web applications due to security concerns, and the large amount of data that would be needed for the voice-enabled web applications. Moreover, there has to date been no proposed arrangement that enables a user to personalize a unified messaging system application such as a voice messaging application, as conventional telephony type voicemail systems are strictly limited to the parameters specified by the central programming in the voicemail system.

SUMMARY OF THE INVENTION

There is a need for an arrangement that enables a user to personalize his or her voice enabled web applications, especially without the necessity of client-side data records such as cookies.

These and other needs are attained by the present invention, where an application server, configured for executing a voice application defined by XML documents, selects an XML document for execution of a corresponding voice application operation based on a determined presence of a user-specific XML document that specifies the corresponding voice application operation. The application server, upon receiving a voice application operation request from a browser serving a user, determines whether a personalized, user specific XML document exists for the user and for the corresponding voice application operation. If the application server determines the presence of the personalized XML document for a user-specific execution of the corresponding voice application operation, the application server dynamically generates a personalized HTML page having media content and control tags for personalized execution of the voice application operation; however if the application server determines an absence of the personalized XML document for the user-specific execution of the corresponding voice application operation, the application server dynamically generates a generic HTML page, based on a generic XML page, for generic execution of the voice application operation. Hence, a user can personalize any number of voice application operations, enabling a web-based voice application to be completely customized or merely partially customized.

One aspect of the present invention provides a method in an application server for executing a voice application. The method includes receiving an HTTP request requesting a prescribed voice application operation from a user. The method also includes selectively executing one of a generic XML document that specifies the prescribed voice application operation and a user-specific XML document that specifies the prescribed voice application operation personalized for the identified user, based on a determined presence of the user-specific XML document, for generation of an HTML page having media content corresponding to the prescribed voice application operation. The selected execution of either a generic XML document or a user-specific XML document enables a user to personalized his or her voice application, as desired. Hence, a user can personalize selected XML pages in order to provide a personalized interface, as well as personalized voice application logic and voice application functions such as procedure calls to external databases. Hence, a user can create a voice home page to greet callers with customized options, and/or a customized interface for accessing and retrieval of messages from the user's mailbox.

Another aspect of the present invention provides a system configured for configured for executing a voice application. The application server includes a hypertext transport protocol (HTTP) interface for receiving an HTTP request specifying execution of a prescribed voice application operation for an identified user. The application runtime environment is configured for dynamically generating, in response to the HTTP request, a first hypertext markup language (HTML) document having media content for execution of the voice application operation for the identified user based on execution of a selected XML document, the application runtime environment selecting one of a generic XML document that specifies the prescribed voice application operation and a user-specific XML document that specifies the prescribed voice application operation personalized for the identified user, based on a determined presence of the user-specific XML document. Hence, the application server generates an HTML page for execution of the voice application operation by a browser, based on the determined presence of a user-specific XML document, enabling a user to personalize their application interface and/or voice application functions.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a diagram illustrating an XML document configured for defining a voice application operation for the application server of FIGS. 1 and 2.

BEST MODE FOR CARRYING OUT THE INVENTION

Figure 1:
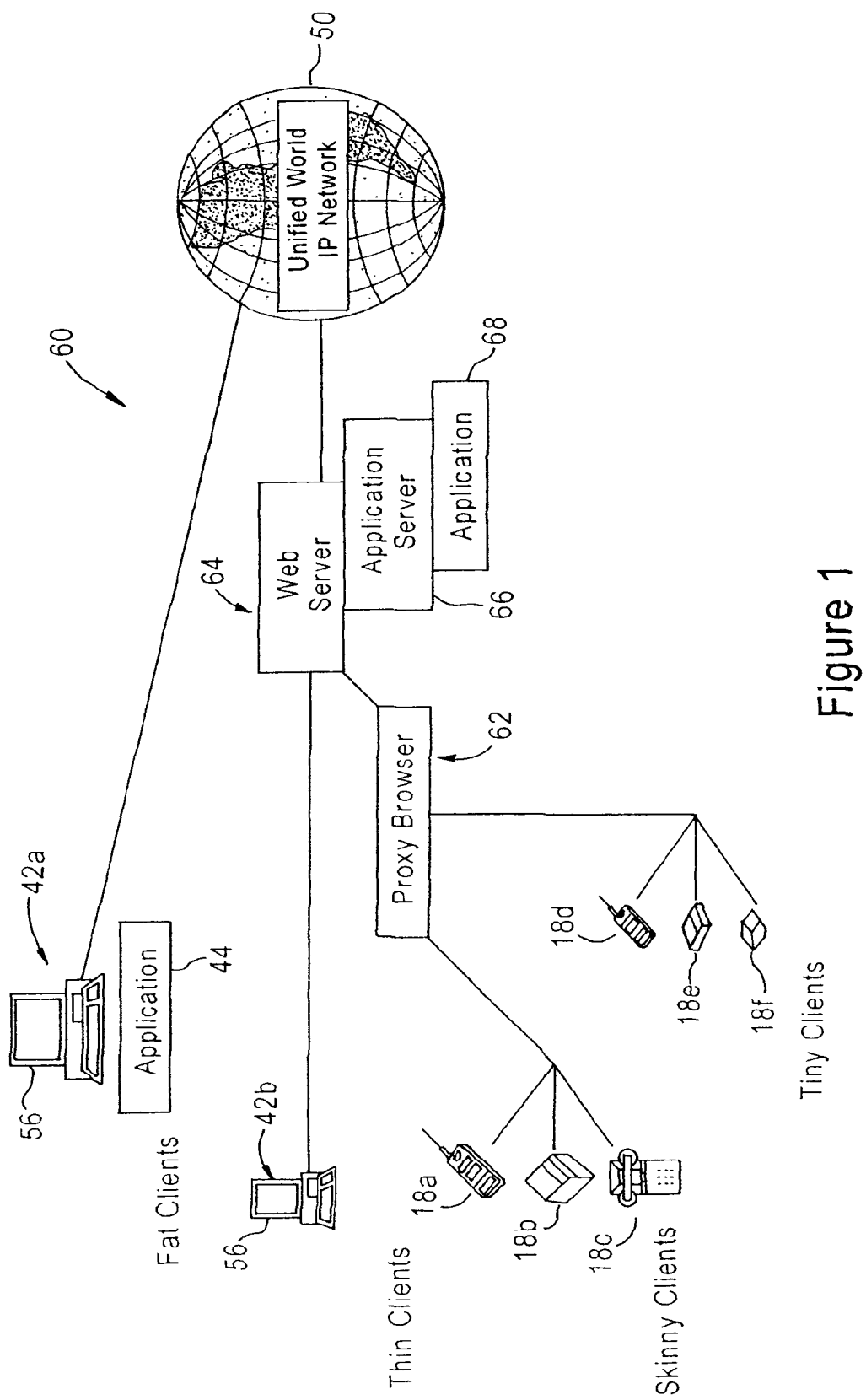
FIG. 1 is a block diagram illustrating an system enabling a personalization of voice enabled web applications according to an embodiment of the present invention.

FIG. 1 is a block diagram illustrating an architecture that provides unified voice messaging services and data services via an IP network using browser audio control according to an embodiment of the present invention, reproduced from FIG. 3 of the application Ser. No. 09/501,516. The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser; in this case, the web browser 56 can use IP protocols such as HTTP to receive and display web pages generated according to hypertext markup language (HTML) from server locations based on uniform resource locators (URLs) input by the user of the PC.

As shown in FIG. 1, each of the clients (tiny clients, skinny clients, thin clients and fat clients) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients", defined as devices that are able to interface with a user to provide voice and/or data services (e.g., via a modem) but cannot perform any control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all. p Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c would receive analog audio signals played by the proxy browser 62 and no text information (unless a display is available); the fax machine 18b and pager 18f would only receive data/text information, and the cellular telephone 18d and the handheld computing device 18e would receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new HTML pages having XML tags during runtime and supply the generated HTML pages having XML tags to the web server 64. Since multiple transactions may need to occur between the browser 56 or 62 and the application server 66, the application server 66 is configured for storing for each existing user session a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 18 or 42.

According to the disclosed embodiment, users are able to create personalized voice applications, where a user may create a voice homepage to greet callers with customized options. Alternatively, a user may create a customized interface for accessing their mailbox and retrieving their messages. In particular, commonly assigned, copending application Ser. No. 09/559,637, filed Apr. 28, 2000 entitled Browser-Based Arrangement for Developing Voice Enabled Web Applications Using Extensible Markup Language Documents and having issued as U.S. Pat. No. 6,578,000, discloses in detail an arrangement for the forms-based methodology for defining voice-enabled web applications using XML documents. A browser-based executable voice application defined by XML documents can be created or modified by users lacking expertise in application development or XML syntax by use of the forms based representation of the application defining XML documents. In particular, the application server 66 is configured for providing an HTML forms representation of the application defining XML documents. The application server 66 is configured for parsing an existing XML document that defines a voice application operation, inserting selected XML tag data that specify application parameters into entry fields of an HTML-based form, and outputting the HTML based form to the browser 56. The browser 56, upon receiving the HTML document having the form specifying entry fields for application parameters for the XML document, displays the form in a manner that enables a user of the voice application to create or modify voice application operations. After the user has input new application parameters or modified existing application parameters in the entry fields, the user submits the form to a prescribed URL that is recognized by the application server 66. The application server 66, upon receiving the form from the corresponding web browser 56, can then create or modify the XML document by inserting the input application parameters as XML tag data in accordance with XML syntax. The application server 66 can then store the XML document for later execution for the user.

According to the disclosed embodiment, the forms-based arrangement for defining voice-enabled web applications is extended to enable users to personalize application defining XML documents. Once the user has created personalized XML documents, the application server 66 can provide a personalized voice application based on detecting a user-specific XML document that specifies the prescribed voice application operation personalized for the identified user. If the application server 66 detects an absence of any user-specific XML document for the corresponding voice application operation, the application server 66 executes a generic XML document for execution of the prescribed was application operation.

Hence, a user can develop a personalized voice application by accessing forms generated by the application server 66, followed by execution of selected XML documents by the application server 66 in order to provide a user-specific voice homepage to greet the callers with customized options, or alternately a user-customized interface for accessing the user's mailbox. A brief description will first be provided from the application Ser. No. 09/559,637 of defining voice applications to illustrate how a user can personalize a voice application, followed by a description of the methodology for selectively executing a personalized voice application according to an embodiment of the present invention.

Figure 2:
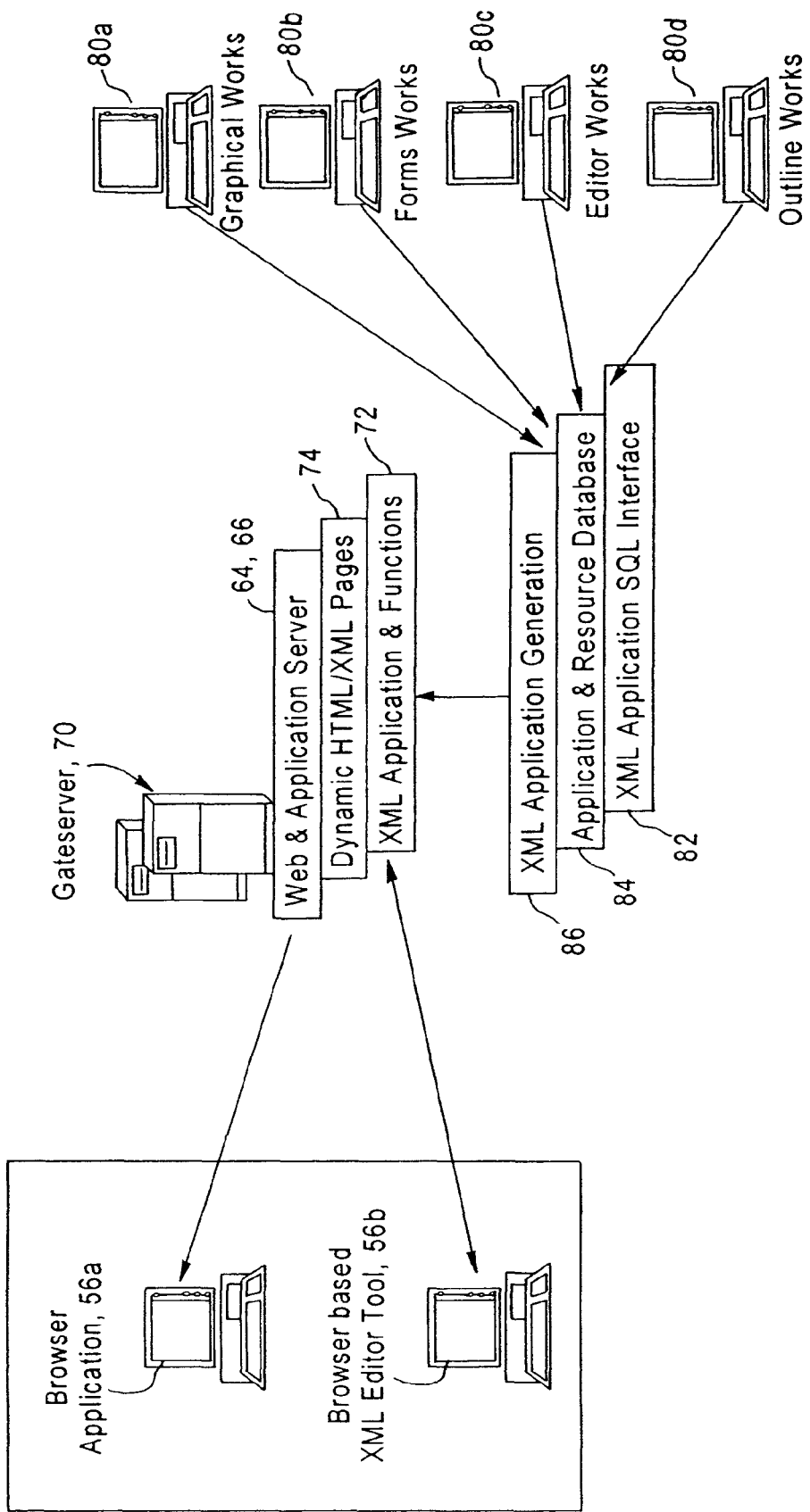
FIG. 2 is a diagram illustrating development tools usable for personalization of the voice enabled web applications.

FIG. 2 is a diagram illustrating development tools usable for development (e.g., personalization) of the voice enabled web applications. As shown in FIG. 2, the web server 64, the application server 66, and the voice web applications 68 reside within a gateserver 70. The gateserver 70 provides HTTP access for a browser based XML editor tool 56b that enables a web programmer to design voice applications by editing XML pages. Generic XML pages (i.e., XML documents that are executable for any user) are stored as XML applications and functions 72, for example within a database accessible by the application server 66. The XML pages stored within the XML application and functions database 72 define the actual application operations to be performed by the application server 66 in its application runtime environment. Hence, the application server 66 executes stored XML applications and functions 72, and in response generates dynamic HTML pages having XML tags, also referred to as HTML/XML pages 74. As described in further detail below with respect to FIGS. 5, 6 and 7, personalized (i.e., user-specific) XML documents are stored in user-specific directories separate from the generic XML documents stored in the XML application and functions database 72.

Figure 5:
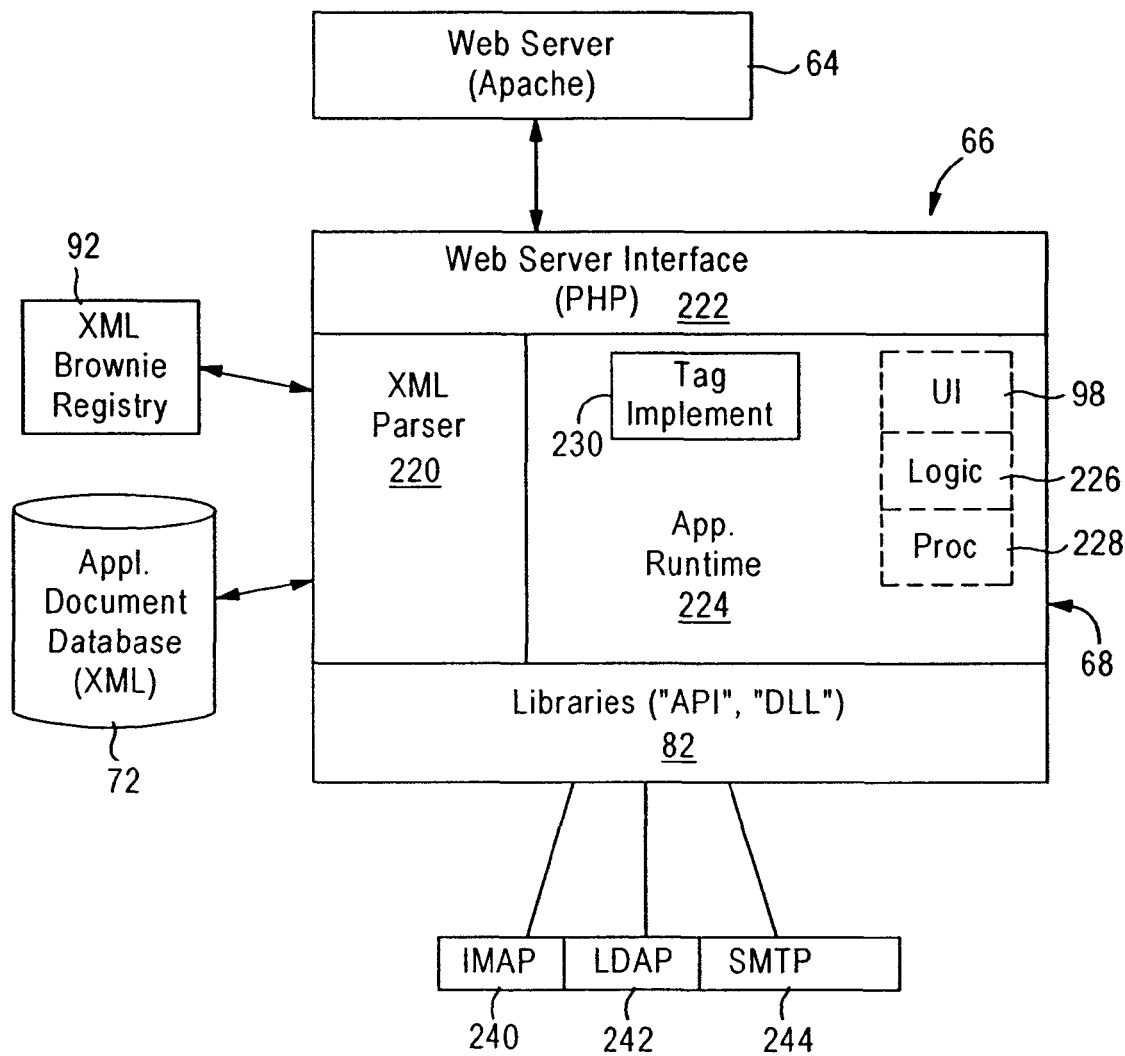
FIG. 5 is a diagram illustrating in detail the application server of FIGS. 1 and 2 according to an embodiment of the present invention.

Four types of XML documents are used by the application server 66 to execute web applications: menu documents, activity documents, decision documents, and "brownies". The menu documents, activity documents, and decision documents are XML documents, stored in the document database 72 or the user-specific directories, that define user interface and boolean-type application logic for a web application, hence are considered "executable" by the application server 66. The brownie document, stored in a separate registry 92 in FIG. 5, is an XML data record used to specify application state and user attribute information for a given XML application during a user session. Hence, the XML documents define user interface logistics and tie services and application server events together in a meaningful way, forming a coherent application or sets of applications. Additional details regarding the definition of executable voice applications using XML documents are described in the application Ser. No. 09/501,516.

Certain development tools having direct access to the application server 66 can be used to establish context information used by the application runtime environment within the application server 66 for execution application operations based on parsing of XML documents. In particular, development tools such as a graphic based development system 80a, a forms-based development system 80b, an editor-based development system 80c, or an outline-based development system 80d may be used to define XML tags and procedure calls for the application runtime environment. The development tools 80 may be used to establish an application and resource database 84 to define low-level operations for prescribed XML tags, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag.

The development tools 80 may be used to establish an application programming interface (API) library 82 (e.g., a SQL interface) for the application runtime environment, enabling the application server 66 to issue prescribed function calls to established services, such as IMAP, LDAP, or SMTP. The library 82 may be implemented as dynamically linked libraries (DLLs) or application programming interface (API) libraries. If desired, the development tools 80 may also be used to generate an XML application as a stored text file 86, without the use of the forms generated by the application server 66, described below.

A user of the browser 56 typically sends a request to the application server 66 (via the web server 64) for a voice application operation 82, for example using an interface executable by a browser 56 or 62, for accessing new voice mail messages, new facsimile messages, new e-mail messages, and the like. A user of the browser 56 also can send a request to the application server 66 for creating or modifying an XML document defining a voice application operation, via a development tool common gateway interface (CGI). In particular, the web browser 56 posts a user input for an application operation (i.e., an HTTP request) to a first URL for the voice application operation. In contrast, the web browser 56 posts to another URL for accessing the development tool CGI. Accessing the application server via the CGI enables the application server 66 to access a selected XML document, for example the XML document 100 illustrated in FIG. 3, in order to dynamically generate a form 102, illustrated in FIG. 4, that specifies selected application parameters of the XML document 100. Hence, accessing the application server by posting the user input according to a first URL causes execution of the XML document 100, whereas accessing the application server via the CGI causes the application server 66 to generate a form that specifies the contents of the XML document 100.

Hence, accessing the application server 66 via the CGI enables the web browser to perform different operations on the selected XML document 100, described in further detail in the application Ser. No. 09/559,637.

Figure 4:
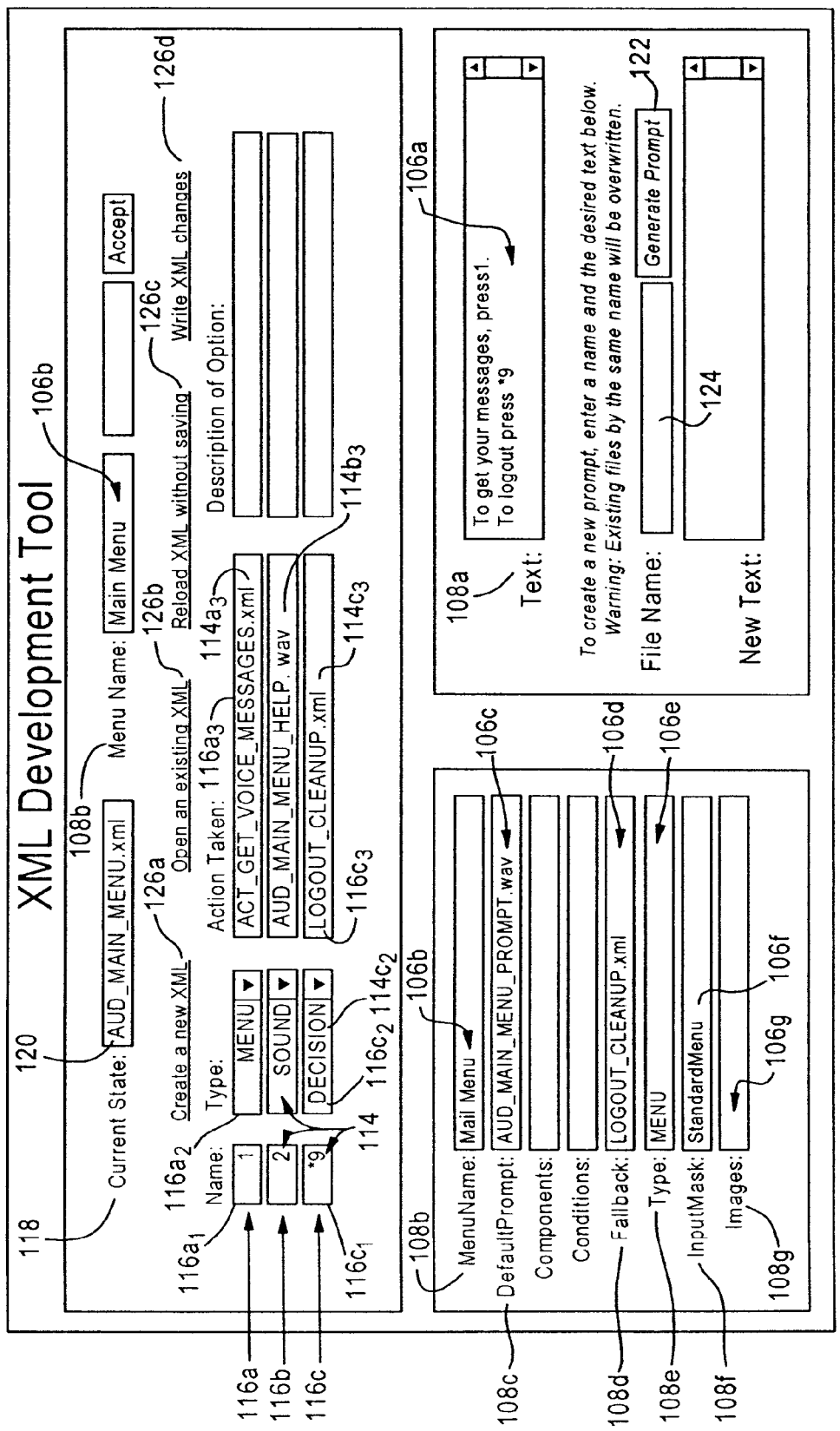
FIG. 4 is a diagram illustrating a browser display of a form for user entry of voice application parameters.

FIG. 4 illustrates the insertion of the application parameters 106 into respective entry fields 108 by the application server 66 for display of the form 102 by the browser 56. As shown in FIG. 4, the application server 66 parses the XML tags 104*a*, 104*b*, 104*c*, . . . 104*g* and in response inserts the application parameters 106*a*, 106*b*, 106*c*, . . . 106*g* into the respective entry fields 108*a*, 108*b*, 108*c*, . . . 108*g*. For example, the application server 66, in response to detecting the XML text tag 104*a*, dynamically generates an HTML document that specifies a form 102 having the entry field 108*a* and including the corresponding application parameter 106*a*; hence, each of the XML tags 104 has a corresponding entry field 108 within the form 102 specified by the HTML page generated by the application server 66, including XML tags 108*g* having empty application parameters 106*g*. Note that XML tags 110 used to define the XML document attributes (and consequently the structure of the form 102) are predefined by one of the developer workstations 80 or the browser based XML editor tool 56*b* that do not rely on the form 102.

The application server 66 also parses the XML option tags 112 for insertion of menu application parameters 114 into the respective menu entry fields 116. For example, the application server 66 inserts the menu application parameters $114a_1$, $114a_2$, and $114a_3$ into the respective menu entry fields $116a_1$, $116a_2$, and $116a_3$, and inserts the menu application parameters $114c_1$, $114c_2$, and $114c_3$ into the respective menu entry fields $116c_1$, $116c_2$, and $116c_3$ generated by the HTML document in step 206.

The application server 66 also specifies an entry field 118 that enables the browser user to specify the filename 120 of the XML document (i.e., the designation used by the application server 66 when referring to the "current state"). In addition, the application server 66 specifies an addition button 122 that enables users to add menu options 112 to an XML document; hence, if the user enters a new file name within the entry field 124 and presses the addition button 122, the browser 56 posts to a prescribed URL to cause the application server to generate a new XML document having a name specified in the field 124, and to generate another HTML form having an additional menu entry field 116 for the new prompt.

The application server also specifies within the HTML form 102 prescribed URLs associated with command hyperlinks 126, such that posting the form 102 by the browser 56 to a corresponding one of the URLs 126 results in a corresponding operation performed by the application server 66.

Hence, the HTML entry form 102 generated by the application server 66 provides all the fields and command functions necessary for a user to create or modify a new or existing XML document, regardless of whether the XML document is a menu-based XML document or a non-menu XML document.

The above-described arrangement enables a user lacking programming skills or knowledge of XML syntax to personalize his or her voice-enabled web applications defined in XML documents, by accessing default XML documents, modifying the default documents using the form 102, and posting the form 102 back to the application server 66 via the CGI for storage as a personalized XML document. As described below, the application server 66 stores the personalized document separately from the generic XML application documents stored in the XML document database 72.

FIG. 5 is a diagram illustrating in detail the application server 66 according to an embodiment of the present invention. The application server 66 is implemented as a server executing a PHP hypertext processor with XML parsing and processing capabilities, available open source at the website address "www.php.net". As shown in FIG. 5, the server system 66 includes an XML parser 220 configured for parsing the application-defining XML documents (e.g., XML document 100) stored in the XML document database 72, or the XML documents (i.e., "brownies") stored in the registry 92 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache Web servers.

The application server 66 also includes a runtime environment 224 for execution of the parsed XML documents. As described above, the runtime environment 224 may selectively execute any one of user interface operation 98, a logic operation 226, or a procedure call 228 as specified by the parsed XML document by executing a corresponding set of executable functions based on the rule set for the corresponding operation. In particular, the application runtime environment 224 includes a tag implementation module 230 that implements the XML tags parsed by the XML parser 220. The tag implementation module 230 performs relatively low-level operations, for example dynamically generating an XML menu page using executable functions specified by a menu rule set in response to detecting a menu tag, performing a logical operation using executable functions specified by a logic rule set in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 82 that may be implemented as dynamically linked libraries (DLLs) or application programming interface (API) libraries. The libraries 82 enable the runtime environment 224 to implement the procedures 228 as specified by the appropriate XML document. For example, the application server 66 may issue a function call to one of a plurality of IP protocol compliant remote resources 240, 242, or 244 according to IMAP protocol, LDAP Protocol, or SMTP protocol, respectively, described below. For example, the PHP hypertext processor includes executable routines capable of accessing the IMAP or LDAP services. Note that the mechanisms for accessing the services 240, 242, or 244 should be established within the application server before use of XML documents that reference those services. Once the services 240, 242, or 244 are established, the application runtime environment 224 can perform a function operation by using executable functions specified by a function call rule set.

The arrangement for executing a personalized voice-enabled web application will now be described. As described above with respect to FIGS. 2, 3 and 4, a user is able to personalize his or her voice application by sending an HTTP request to the application server 66, for example via a CGI interface, for generation of an HTML document that specifies the form 102 for modifying application parameters of a prescribed XML document. The application server 66 responds to the HTTP request by accessing application document database 72 for retrieval of the selected generic XML document, and by generating the HTML document having the form 102 with the selected application parameters. Once the user modifies (i.e., personalizes) the application parameters within the form 102 and posts the completed form 102 to a prescribed URL via the CGI interface, the application server 66 generates a new user-specific XML document that specifies the voice application operations as personalized by the corresponding user, and stores the user-specific XML document in a user-specific database.

Hence, the use of user-specific XML documents enables a user to override pre-existing generic XML documents for certain application operations. Hence, a subscriber can create a personalized unified voice, e-mail and fax messaging system for other users attempting to access the subscriber, as well as a personalized user interface for a subscriber accessing his or her mailbox for retrieval of messages.

Figure 6:
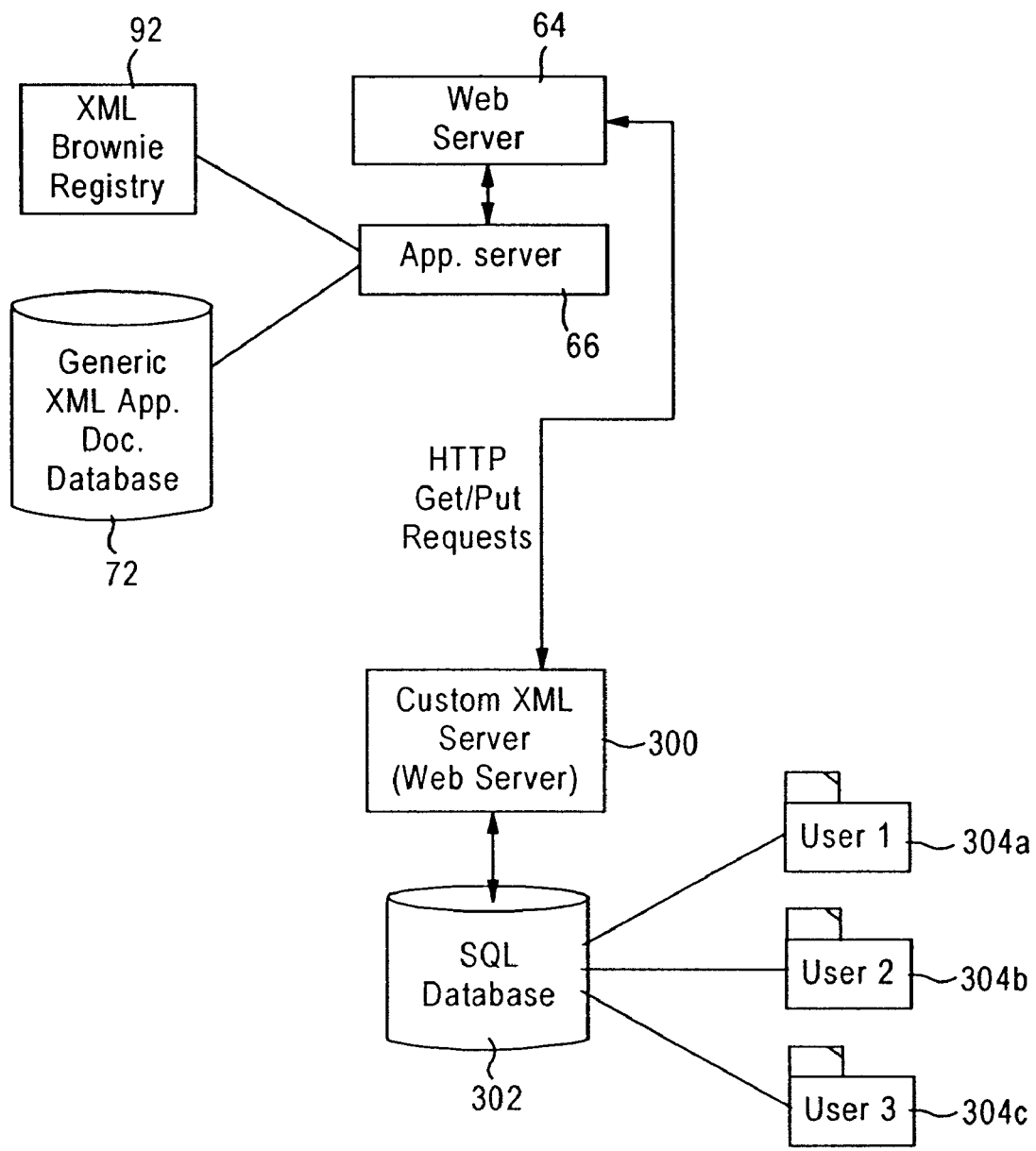
FIG. 6 is a diagram illustrating a system for executing a personalized voice application according to an alternative embodiment of the present invention.

FIGS. 5 and 6 illustrate alternative arrangements for storing the user-specific XML documents. In particular, FIG. 5 illustrates the arrangement where the application server 66 stores user-specific XML documents in the user's IMAP account within the IMAP message storage 240, where the IMAP message storage 240 includes an XML folder as a subfolder of the user's inbox for storage of the user-specific XML documents. Hence, the IMAP message storage 240 can store greetings, messages (e.g., voice, e-mail or fax), as well as the user-specific XML documents. Alternatively the user-specific XML documents may be stored within the LDAP directory 242 as part of the subscriber profile information for the corresponding user.

FIG. 6 illustrates an alternative arrangement for storing the user-specific XML documents, where the application server 66 outputs via the web server 64 an HTTP put request to another web server 300 configured for storing and retrieving user-specific XML documents from a database 302, for example a SQL database. The database 302 is configured for storing user-specific XML documents in user directories 304, wherein each user directory 304 is identified according to the corresponding user identity (e.g., "user1"). Hence, the application server 66 can cause the web server 64 to output an HTTP put request having a uniform resource locator (URL) that specifies the host name of the custom XML web server 300, the user identity, and the XML document name. The application server 66 also can retrieve a user-specific XML document by outputting an HTTP get request using the same URL to obtain the corresponding user-specific XML document for execution of the prescribed voice application operation for the corresponding user.

Figure 7A:
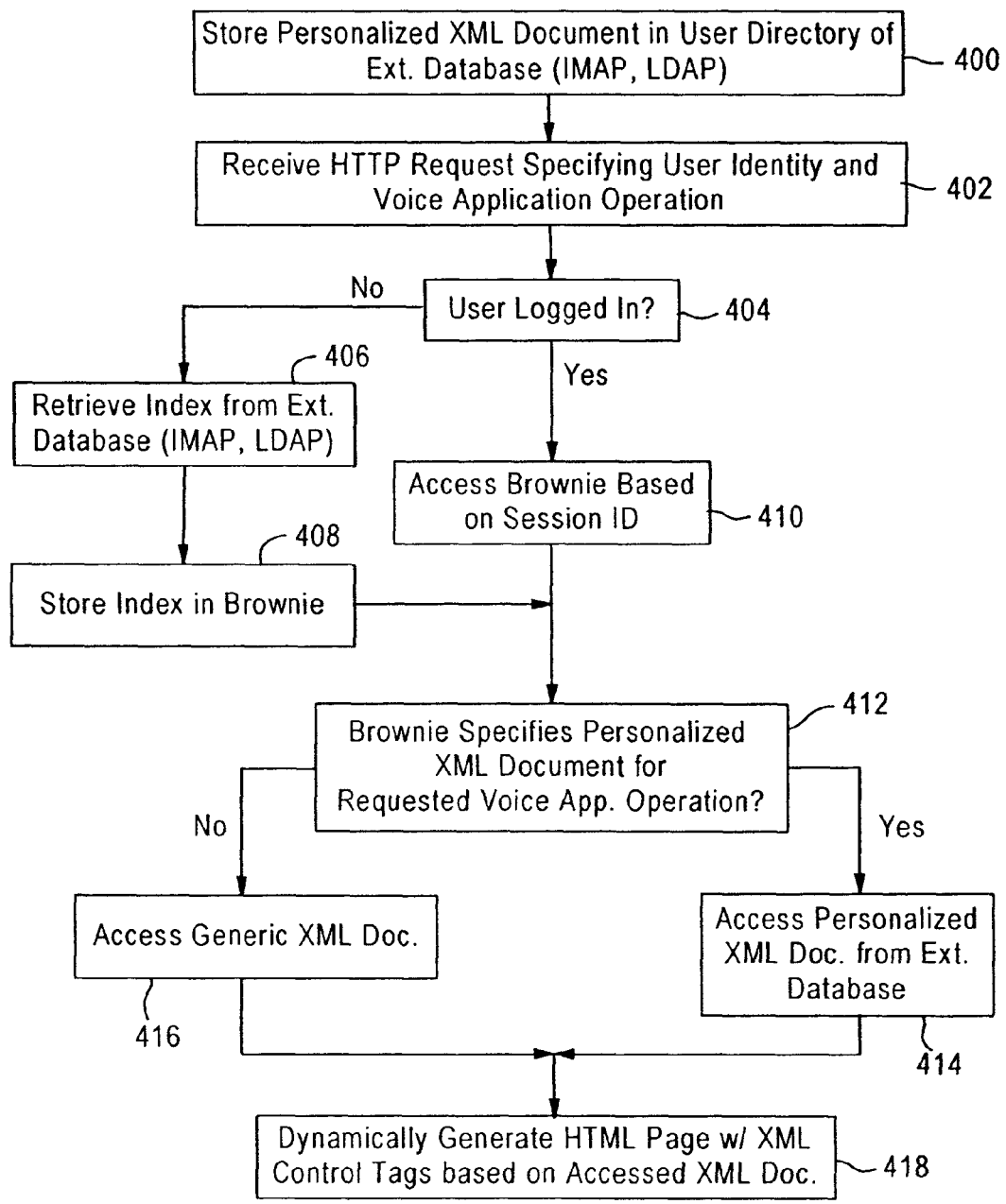
FIGS. 7A and 7B are diagrams illustrating methods for executing a personalized voice application according to respective embodiments of the present invention.
Figure 7B:
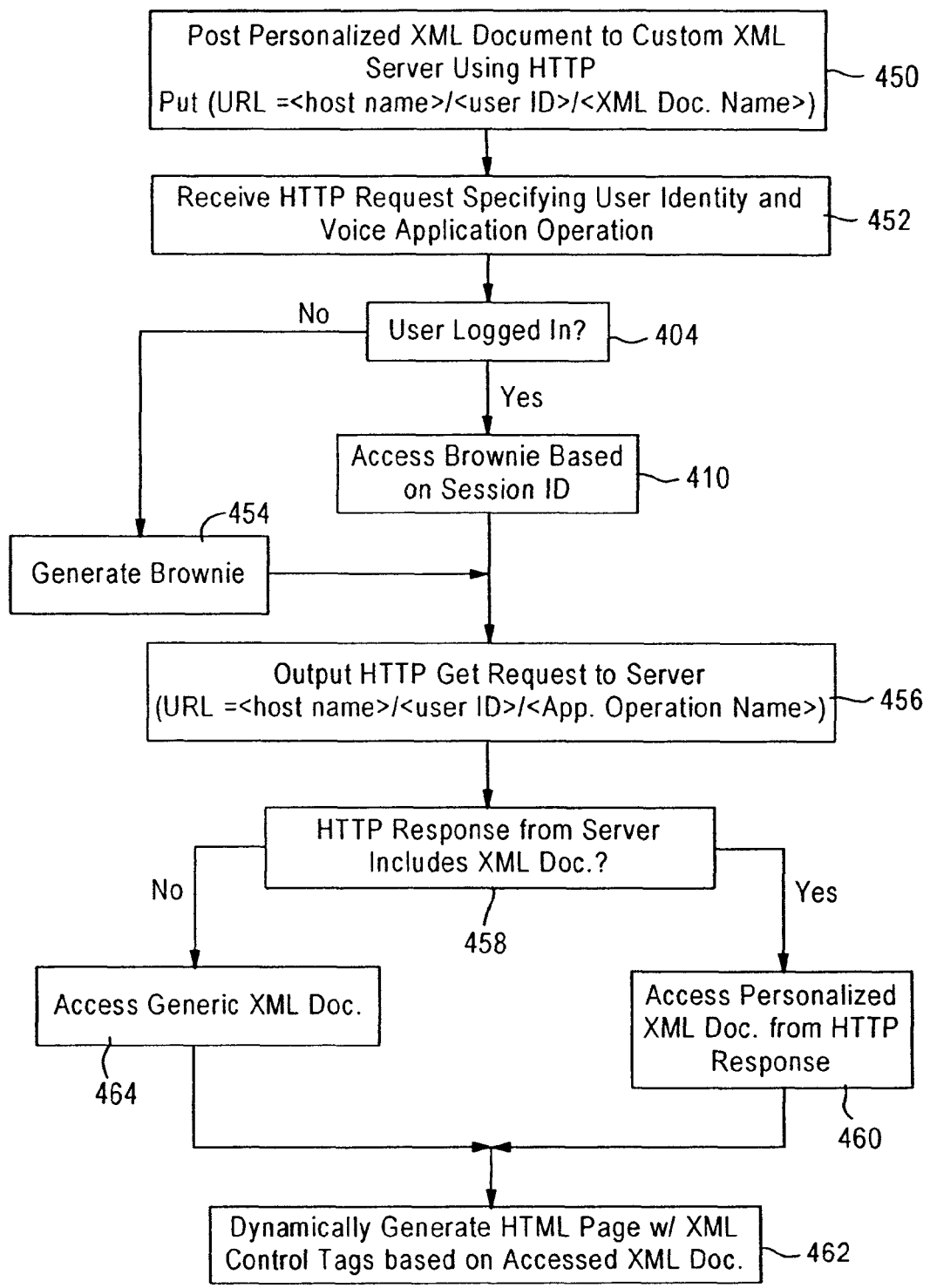

FIG. 7A is a flow diagram illustrating the method of executing a voice application according to the arrangement of FIG. 5. FIG. 7B is a flow diagram illustrating the method of executing a voice application according to the arrangement of FIG. 6. The steps described in FIGS. 7A and 7B can be implemented as executable code stored on a computer readable medium (e.g., a hard disk drive, a floppy drive, a random access memory, a read only memory, an EPROM, a compact disc, etc.).

As shown in FIG. 7A, the application server 66 stores in step 400 the personalized XML document, generated based on the posted form 102, in the corresponding user directory of an external database, such as the IMAP data store 240 or the LDAP directory 242. The application server 66 will later receive an HTTP request in step 402 that specifies a user identity and a voice application operation. For example, the HTTP request may specify initiation of a unified voice messaging routine to enable a calling party to leave a message for the user; alternatively, the HTTP request may specify initiation of a message retrieval routine by the user specified by the user identity.

The application server 66 then checks in step 404 whether the user having generated the HTTP request is already logged into an existing application session, for example by determining whether the URL in the HTTP request specifies a pre-existing valid session identifier for a brownie within the registry 92.

If the application server 66 determines that the user is not logged in, the application server 66 retrieves in step 406 from the external database (e.g., the IMAP message storage 240 or the LDAP directory 242) an index that specifies all the user-specific XML documents available for the corresponding user. In particular, the index eliminates unnecessary function calls by providing the application server 66 with information necessary to determine whether the user has a corresponding user-specific XML document personalized for the corresponding voice application operation; the application server 66 generates a new brownie having a valid session identifier and user ID, and stores in step 408 the index within the brownie. Hence, the index within the brownie enables the application server 66 to determine the presence of a user-specific XML document for the corresponding voice application operation, without the necessity of repeated access of the IMAP or LDAP external databases.

If in step 404 the application server 66 detects a valid session identifier within the URL, the application server 66 uses the session identifier to obtain the corresponding brownie based on the user identity from the registry 92 in step 410. The application server 66 then parses the XML tags within the brownie to determine in step 412 whether the brownie includes an index that specifies a personalized XML document for the requested voice application operation. If in step 412 the application server 66 detects the presence of the user-specific XML document from the index, the application server 66 accesses in step 414 the personalized XML document from the external database (e.g., the IMAP message storage 240 or the LDAP directory 242) based on the user identifier specified in the brownie, and based on the requested application operation. If in step 412 the application server 66 detects an absence of any personalized XML document for the requested voice application operation, the application server 66 accesses in step 416 the generic XML document from the XML document database 72.

The application server 66 then executes in step 418 the accessed XML document (e.g., the personalized XML document or the generic XML document) and dynamically generates an HTML page having XML control tags for media control of text, audio files (e.g., .wav files), etc. The HTML page is output by the web server 64 to the web browser 56 or 62 for execution of the voice application operation.

FIG. 7B is a flow diagram illustrating storage and execution of personalized XML documents according to the system of FIG. 6. The application server 66 stores a personalized XML document by posting an HTTP put command in step 450 to the custom XML server 300. In particular, the application server 66 generates a URL that specifies the host name of the custom XML server 300, the user ID of the user having generated the personalized XML document as a folder 304 within the database 302, and the name of the XML document. It should be noted that the name of the personalized XML document and the generic XML document typically are identical, enabling the personalized XML document to simply be substituted for the generic XML document during execution by the application runtime environment 224.

The application server 66 will later receive an HTTP request in step 452, similar to step 402 in FIG. 7A. If the application server 66 determines in step 404 that the user is logged in, the application server 66 accesses the brownie in step 410; otherwise, the application server 66 creates a new brownie for the new user session in step 454.

The application server 66 then parses the brownie to determine the application state, for example the name of the next XML document to be executed. The application server 66 outputs in step 456 an HTTP get request to the custom XML server 300 based on the user identifier specified in the brownie and the application operation name. For example, the application server 66 generates a URL that specifies the host name, the folder 304 for the corresponding user, and the name of the application operation or the XML document name to be retrieved for execution.

The custom XML server 300 accesses the database 302 in response to the HTTP get request, and generates an HTTP response based on whether the requested XML document was found for the corresponding user. For example, the custom XML server 300 outputs an HTTP response that includes the user-specific XML document in response to detecting a match between the user identity for the folder 304 and the user identifier specified within the HTTP get request, and a match between the voice application operation specified in the HTTP get request and a function identifier (i.e., the name of the stored XML document). However if the custom XML server 300 is not detect a match in either the identified user or the requested was application operation, the XML server 300 outputs an HTTP response indicating an unavailability of the requested user-specific XML document.

The application server 66 determines in step 458 whether the HTTP response from the custom XML server 300 includes the requested XML document. If the HTTP response includes the XML document, the application server accesses the personalized XML document from the HTTP response in step 460 and dynamically generates the HTML page in step 462, similar to step 418. However, if the application server 66 determines that the HTTP response specifies that the requested XML document is not available, the application server 66 accesses in step 464 the generic XML document from the document database 72, and dynamically generates the corresponding HTML page by parsing the generic XML document in step 462.

According to the disclosed embodiment, personalized XML documents are stored and retrieved by an application server configured for execution of voice-enabled web applications defined by XML documents. Hence, users can create a voice homepage to greet callers with customized options, as well as a customized interface for accessing their mailbox for retrieval of messages, without any modification to existing document used to define a predetermined sequence of voice application operations.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an application server for executing a voice application, the method comprising:
    receiving a Hypertext Transport Protocol (HTTP) request requesting a prescribed voice application operation for a user; and
    executing a user-specific XML document that specifies the prescribed voice application operation personalized for the user for generation of a web page having media content corresponding to the prescribed voice application operation.

2. The method of claim 1, further comprising determining the presence of the user-specific XML document based on a user identity for the user and the requested prescribed voice application operation.

3. The method of claim 2, wherein the determining step includes accessing an external database, configured for storing data for respective users, for retrieval of the user-specific XML document.

4. The method of claim 3, wherein the determining step further includes:
    accessing a first XML document configured for storing user-specific application state and attribute information; and
    determining whether the first XML document for the corresponding user specifies the presence of the user-specific XML document for the requested prescribed voice application operation.

5. The method of claim 4, wherein the step of accessing an external database includes accessing an Internet Message Access Protocol (IMAP) database for retrieval of the user-specific XML document.

6. The method of claim 4, wherein the step of accessing an external database includes accessing a Lightweight Directory Access Protocol (LDAP) database for retrieval of the user-specific XML document.

7. The method of claim 4, further comprising:
    retrieving from the external database an index of the user-specific XML documents in response to an initial HTTP request requesting a login of the corresponding user based on the user identity; and
    storing the index into the first XML document.

8. The method of claim 7, wherein the step of determining the presence of the user-specific XML document includes searching the list in the first XML document for the user-specific XML document.

9. The method of claim 3, wherein the step of accessing an external database includes:
outputting an HTTP get request for the user-specific XML document to a server configured for management of the external database; and
receiving a response to the HTTP get request from the server, the response including one of the user-specific XML document and a denial of the HTTP get request.

10. The method of claim 9, further comprising outputting an HTTP put request to the server for storage of a new user-specific XML document for the corresponding user.

11. The method of claim 10, wherein the step of outputting an HTTP put request includes posting the HTTP put request to a uniform resource locator specifying a host name of the server, and a directory within the server for the user.

12. The method of claim 9, wherein the step of outputting an HTTP get request includes posting the HTTP get request to a uniform resource locator specifying a host name of the server, and a directory within the server for the user.

13. A non-transitory computer readable medium having stored thereon sequences of instructions for executing a voice application, the sequences of instructions including instructions for performing the steps of:
receiving an HTTP request requesting a prescribed voice application operation for a user; and
executing a user-specific XML document that specifies the prescribed voice application operation personalized for the user for generation of a web page having media content corresponding to the prescribed voice application operation.

14. The medium of claim 13, further comprising instructions for determining the presence of the user-specific XML document based on a user identity for the user and the requested prescribed voice application operation.

15. The method of claim 14, wherein the determining step includes accessing an external database, configured for storing data for respective users, for retrieval of the user-specific XML document.

16. The medium of claim 15, wherein the determining step further includes:
accessing a first XML document configured for storing user-specific application state and attribute information; and
determining whether the first XML document for the corresponding user specifies the presence of the user-specific XML document for the requested prescribed voice application operation.

17. The medium of claim 16, wherein the step of accessing an external database includes accessing an Internet Message Access Protocol (IMAP) database for retrieval of the user-specific XML document.

18. The medium of claim 16, wherein the step of accessing an external database includes accessing a Lightweight Directory Access Protocol (LDAP) database for retrieval of the user-specific XML document.

19. The medium of claim 15, wherein the step of accessing an external database includes:
outputting an HTTP get request for the user-specific XML document to a server configured for management of the external database; and
receiving a response to the HTTP get request from the server, the response including one of the user-specific XML document and a denial of the HTTP get request.

20. The medium of claim 19, further comprising instructions for outputting an HTTP put request to the server for storage of a new user-specific XML document for the corresponding user.

* * * * *